(12) United States Patent
Yan

(10) Patent No.: US 10,432,766 B2
(45) Date of Patent: Oct. 1, 2019

(54) LOUDSPEAKER, LOUDSPEAKER DEVICE AND MOBILE TERMINAL

(71) Applicant: GUANGDONG OPPO MOBILE TELECOMMUNICATIONS CORP., LTD., Dongguan (CN)

(72) Inventor: Bixiang Yan, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/852,460

(22) Filed: Dec. 22, 2017

(65) Prior Publication Data
US 2018/0270338 A1 Sep. 20, 2018

(30) Foreign Application Priority Data

Mar. 14, 2017 (CN) .......................... 2017 1 0152601
Mar. 14, 2017 (CN) .......................... 2017 2 0249544

(51) Int. Cl.
*H04M 1/03* (2006.01)
*H04R 1/28* (2006.01)
*H04R 9/06* (2006.01)

(52) U.S. Cl.
CPC ............ *H04M 1/035* (2013.01); *H04R 1/288* (2013.01); *H04R 1/2811* (2013.01); *H04R 9/06* (2013.01); *H04R 2499/11* (2013.01)

(58) Field of Classification Search
CPC ....... H04M 1/035; H04R 1/2811; H04R 9/06; H04R 1/288; H04R 2499/11; H04R 9/025; H04R 9/022; H04R 11/02; H04R 2400/13

(Continued)

(56) References Cited

U.S. PATENT DOCUMENTS

| 7,953,461 B2 * | 5/2011 | Fukazawa | ............... H04M 1/03 455/569.1 |
| 9,479,850 B2 * | 10/2016 | Lee | ........................ H04M 1/035 |

(Continued)

FOREIGN PATENT DOCUMENTS

| CN | 101361400 | 2/2009 |
| CN | 104202700 | 12/2014 |

(Continued)

OTHER PUBLICATIONS

SIPO, First Office Action for CN App. No. 201710152601, dated Jun. 4, 2018.

(Continued)

*Primary Examiner* — Oyesola C Ojo
(74) *Attorney, Agent, or Firm* — Hodgson Russ LLP

(57) ABSTRACT

The present disclosure provides a loudspeaker, a loudspeaker device and a mobile terminal. The loudspeaker includes: a frame having an outer circumferential side wall, an inner circumferential side wall arranged opposite to the outer circumferential side wall, and an acoustic output hole penetrating the outer circumferential side wall and the inner circumferential side wall; a diaphragm having a periphery connected with the frame along a circumferential direction; and a drive assembly comprising a first driving member fixed to the diaphragm and a second driving member fixed to the frame, the first driving member being vibratory relative to the second driving member to drive the diaphragm to vibrate, thereby emitting a sound wave and making the sound wave pass through the acoustic output hole.

20 Claims, 9 Drawing Sheets

(58) Field of Classification Search
USPC .......................................................... 381/152
See application file for complete search history.

(56) References Cited

U.S. PATENT DOCUMENTS

| | | | |
|---|---|---|---|
| 10,063,949 B2* | 8/2018 | Nittyinpera | H04M 1/035 |
| 2004/0043801 A1* | 3/2004 | Shimokawatoko | H04M 1/0214 |
| | | | 455/575.3 |
| 2007/0049357 A1* | 3/2007 | Daimon | H04M 1/03 |
| | | | 455/575.1 |
| 2007/0116321 A1* | 5/2007 | Jang | H04M 1/035 |
| | | | 381/388 |
| 2012/0281869 A1* | 11/2012 | Takewa | H04R 1/345 |
| | | | 381/398 |
| 2013/0142380 A1* | 6/2013 | Tada | H04R 9/025 |
| | | | 381/413 |
| 2014/0023224 A1 | 1/2014 | Tao | |
| 2014/0029779 A1 | 1/2014 | Yamauchi et al. | |
| 2015/0016660 A1* | 1/2015 | Matsunnura | H04R 9/06 |
| | | | 381/415 |
| 2015/0125025 A1* | 5/2015 | Button | H04R 9/025 |
| | | | 381/401 |
| 2015/0296281 A1* | 10/2015 | Niittyinpera | H04M 1/035 |
| | | | 381/332 |
| 2016/0227313 A1 | 8/2016 | Cai et al. | |
| 2017/0041703 A1 | 2/2017 | Herold et al. | |
| 2017/0099548 A1* | 4/2017 | Schoeffnnann | H04R 1/288 |
| 2017/0171664 A1* | 6/2017 | Shao | H04R 9/06 |

FOREIGN PATENT DOCUMENTS

| | | | |
|---|---|---|---|
| CN | 104469633 | 3/2015 | |
| CN | 104540080 | 4/2015 | |
| CN | 105872917 | 8/2016 | |
| CN | 102696238 B | 2/2017 | |
| CN | 106375886 A | 2/2017 | |
| CN | 106454657 | 2/2017 | |
| CN | 106851504 | 6/2017 | |
| CN | 206559633 | 10/2017 | |
| CN | 107454527 | 12/2017 | |
| CN | 107454529 | 12/2017 | |
| EP | 2603017 | 6/2013 | |
| JP | 61005699 A * | 1/1986 | H04R 9/041 |

OTHER PUBLICATIONS

EPO, Office Action for EP Application No. 17211055, dated Jul. 2, 2018.
English translation of the ISR/WO for PCT Application CN2017118314, Mar. 15, 2018.
Taiwan Intellectual Property Office, Office Action, Application No. 106144215 (dated Dec. 7, 2018).
EPO, Office Action for EP Application No. 17211055, dated Jul. 24, 2019.

* cited by examiner

LOUDSPEAKER, LOUDSPEAKER DEVICE AND MOBILE TERMINAL

CROSS-REFERENCE TO RELATED APPLICATION

This application claims priority to and benefits of Chinese Patent Application No. 201710152601.8, filed with State Intellectual Property Office on Mar. 14, 2017, and Chinese Patent Application No. 201720249544.0, filed with State Intellectual Property Office on Mar. 14, 2017, the entire content of which is incorporated herein by reference.

FIELD

The present disclosure relates to a technical field of electronic equipment, and more particularly, to a loudspeaker, a loudspeaker device and a mobile terminal.

BACKGROUND

At present, a mobile terminal product gets thinner and thinner, and a thickness for a loudspeaker volume chamber is correspondingly reduced. A moving-coil loudspeaker is currently designed in such a way that an acoustic output hole is defined in a bottom of the loudspeaker while a sound source is provided at a top thereof, i.e. the acoustic output hole is arranged opposite to the sound source. In such a structure, the loudspeaker is assembled in the loudspeaker volume chamber; on the one hand, in order to guarantee a relatively small thickness of the loudspeaker volume chamber, a distance from the acoustic output hole in the bottom of the loudspeaker to a sealing wall of the loudspeaker volume chamber is reduced, resulting in increased acoustic resistance against sound output of the loudspeaker, and further weakening the sound received by a user. On the other hand, in order to guarantee reduced acoustic resistance against the sound output of the loudspeaker, the distance from the acoustic output hole in the bottom of the loudspeaker to the sealing wall of the volume chamber is enlarged, resulting in a relatively large thickness of the sealed volume chamber, and further wasting space for use. Therefore, the user cannot obtain a loudspeaker that has small enough acoustic resistance and saves the space for use, i.e. degrading user experience.

SUMMARY

The present disclosure aims to provide a loudspeaker, a loudspeaker device and a mobile terminal which upgrade user experience.

In order to solve the above technical problem, the present disclosure provides a loudspeaker. The loudspeaker includes: a frame having an outer circumferential side wall, an inner circumferential side wall arranged opposite to the outer circumferential side wall, and an acoustic output hole penetrating the outer circumferential side wall and the inner circumferential side wall; a diaphragm having a periphery connected with the frame along a circumferential direction; and a drive assembly comprising a first driving member fixed to the diaphragm and a second driving member fixed to the frame, the first driving member being vibratory relative to the second driving member to drive the diaphragm to vibrate, thereby emitting a sound wave and making the sound wave pass through the acoustic output hole.

The present disclosure further provides a loudspeaker device that includes a loudspeaker, the loudspeaker includes a frame having an outer circumferential side wall, an inner circumferential side wall arranged opposite to the outer circumferential side wall, and a diaphragm having a periphery connected with the frame along a circumferential direction, and a drive assembly comprising a first driving member fixed to the diaphragm and a second driving member fixed to the frame, the first driving member being able to vibrate relative to the second driving member, an acoustic output hole penetrating the frame and the second driving member. The loudspeaker device also includes a box body having a sealed volume chamber, and the loudspeaker is fixed in the sealed volume chamber.

The present disclosure further provides a mobile terminal that includes a housing, a mainboard fixed in the housing, and a loudspeaker device fixed to a bottom end of the housing. The loudspeaker device includes a loudspeaker, and a box body. The loudspeaker includes a frame defining an acoustic output hole penetrating a circumferential side wall of the frame; a diaphragm having a periphery connected with the frame along a circumferential direction; and a drive assembly including a first driving member fixed to the diaphragm and a second driving member fixed to the frame, the first driving member being able to vibrate relative to the second driving member. The box body defines a sealed volume chamber, and the loudspeaker is fixed in the sealed volume chamber.

BRIEF DESCRIPTION OF THE DRAWINGS

To describe technical solutions in embodiments of the present disclosure more clearly, the accompanying drawings required for the description of the embodiments will be briefly introduced below. Obviously, the accompanying drawings described below show some embodiments of the present disclosure, and those skilled in the art can obtain other drawings based on these drawings without paying creative efforts.

DETAILED DESCRIPTION

Figure 1:
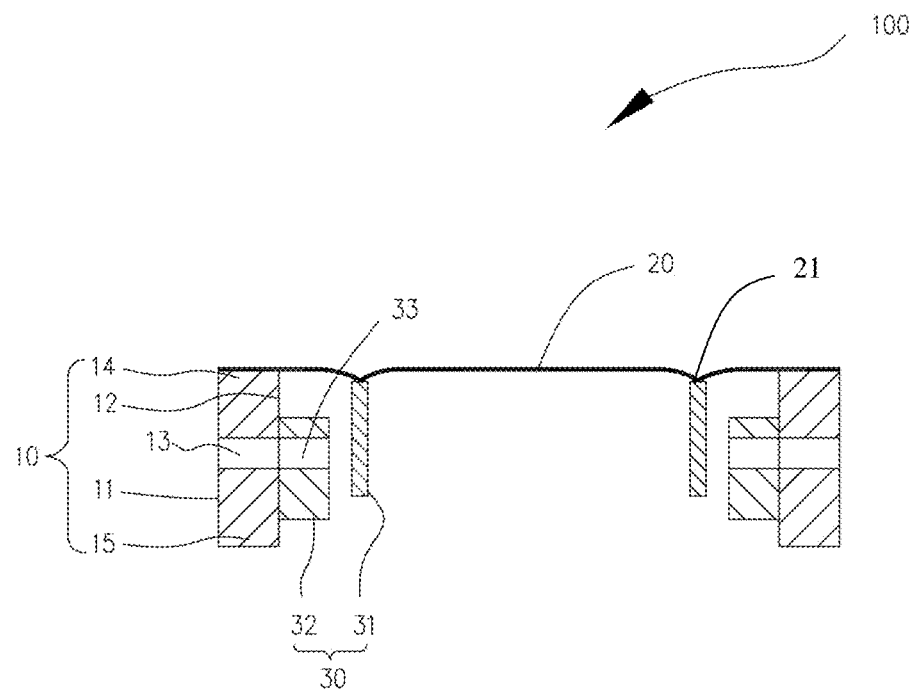
FIG. 1 illustrates a sectional view of a loudspeaker according to an embodiment of the present disclosure.

Technical solutions in embodiments of the present disclosure will be clearly and completely described below with reference to the accompanying drawings in the embodiments of the present disclosure. Obviously, the embodiments described herein are only a part but not all of the embodiments of the present disclosure. Based on the embodiments of the present disclosure, all other embodiments obtained by those skilled in the art without paying creative efforts, fall into the protection scope of the present disclosure.

In the description of the embodiments of the present disclosure, it should be understood that the term "thickness" or the like is construed to refer to the orientation or positional relationship as then described or as shown in the drawings under discussion for simplifying the description of the present disclosure, but do not alone indicate or imply that the device or element referred to must have a particular orientation or be constructed or operated in a particular orientation. Thus, those terms cannot be constructed to limit the present disclosure.

FIG. 1 illustrates a loudspeaker 100. The loudspeaker 100 includes a frame 10, a diaphragm 20 and a drive assembly 30. The frame 10 has an outer circumferential side wall 11 and an inner circumferential side wall 12 arranged opposite to the outer circumferential side wall 11. The frame 10 further defines an acoustic output hole 13 penetrating the outer circumferential side wall 11 and the inner circumferential side wall 12. A periphery of the diaphragm 20 is connected with the frame 10 along a peripheral direction. The drive assembly 30 includes a first driving member 31 and a second driving member 32, the first driving member 31 is fixed to the diaphragm 20, and the second driving member 32 is fixed to the frame 10. The first driving member 31 is vibratory relative to the second driving member 32 to drive the diaphragm 20 to vibrate, thereby emitting a sound wave and making the sound wave pass through the acoustic output hole 13.

By providing the acoustic output hole 13 from the outer circumferential side wall 11 to the inner circumferential side wall 12 of the frame 10, the sound wave emitted by vibration of the diaphragm 20 passes through the acoustic output hole 13, and hence a user receives the sound. Since the acoustic output hole 13 is not arranged opposite to the diaphragm 20, a side of the frame 10 away from the diaphragm 20 does not need to provide a sound transmission space, i.e. saving space for use. Moreover, the sound wave emitted by the drive assembly 30 is subject to reduced acoustic resistance after passing through the acoustic output hole, such that the user can receive relatively loud sound, i.e. improving user experience.

The frame 10 includes a top end 14 and a bottom end 15 arranged opposite to the top end 14. The top end 14 is connected to the periphery of the diaphragm 20. An end face of the top end 14 can adhere to the periphery of the diaphragm 20. The acoustic output hole 13 is located between the top end 14 and the bottom end 15. The acoustic output hole 13 can be a circular hole, or can be a strip-shaped hole. The frame 10 can be a plastic part or can be a metal part.

The diaphragm 20 is provided with a crimp 21 between the periphery of and a geometric center of the diaphragm 20. The crimp 21 extends along the circumferential direction of the diaphragm 20. The crimp 21 reduces tension of the diaphragm 20, such that the diaphragm 20 tends to generate deformation vibration in an area adjacent to the geometric center. The crimp 21 is connected to the first driving member 31, so that the first driving member 31 can drive the diaphragm 20 to deform. The material of the diaphragm 20 may be paper, fiber, metal, wool, silk, or the like.

The first driving member 31 vibrates relative to the second driving member 32 along a direction substantially parallel to a normal direction of the diaphragm 20. The first driving member 31 can vibrate back and forth relative to the second driving member 32, so as to drive the area, substantially adjacent to the geometric center, of the diaphragm 20 to vibrate reciprocally along the normal direction. When vibrating in the area substantially adjacent to the geometric center, the diaphragm 20 drives air to flow and hence generates the sound wave. The sound wave can be radiated to an outer side of the frame 10 through the acoustic output hole 13, so as to be received by the user. Since a sound output direction of the acoustic output hole 13 is substantially perpendicular to the normal direction of the diaphragm 20, i.e. there is no sound transmission path for the loudspeaker 100 in a direction substantially parallel to the normal direction of the diaphragm 20, the top end 14 and the bottom end 15 of the frame 10 can abut against an external component, such that the loudspeaker 100 can be firmly mounted and the space for use can be saved.

In this embodiment, the second driving member 32 is at least partially fixed to the inner circumferential side wall 12 of the frame 10. The second driving member 32 defines a through hole 33 in communication with the acoustic output hole 13. The sound wave emitted by the diaphragm 20 reaches the outer side of the frame 10 through the through hole 33 and the acoustic output hole 13 sequentially.

Figure 2:
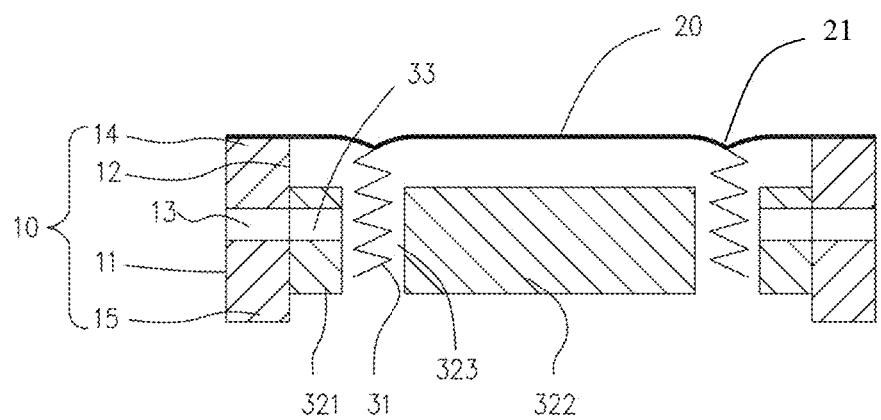
FIG. 2 illustrates another sectional view of a loudspeaker according to an embodiment of the present disclosure.

FIG. 2 illustrates that the first driving member 31 is a coil, and the second driving member 32 is a magnet. After receiving a current signal, the first driving member 31 produces a magnetic field. A direction of the magnetic field produced by the first driving member 31 varies as the current signal changes. The second driving member 32 is a permanent magnet, and a direction of the magnetic field of the second driving member 32 does not change. The first driving member 31 is subject to interaction with the second driving member 32 when the current signal changes, and can vibrate close to or away from the second driving member 32, thereby driving the diaphragm 20 to vibrate. The second driving member 32 includes a first magnet 321 fixed to the inner circumferential side wall 12 and a second magnet 322 located inside the second driving member 321. A gap 323 exists between the second driving member 321 and the second driving member 322. The first driving member 31 has a top connected to the crimp 21 of the diaphragm 20, and a bottom received in the gap 323. Since the first driving member 31 oscillates up and down in the gap 323, the thickness of the loudspeaker 100 can be reduced effectively.

Figure 3:
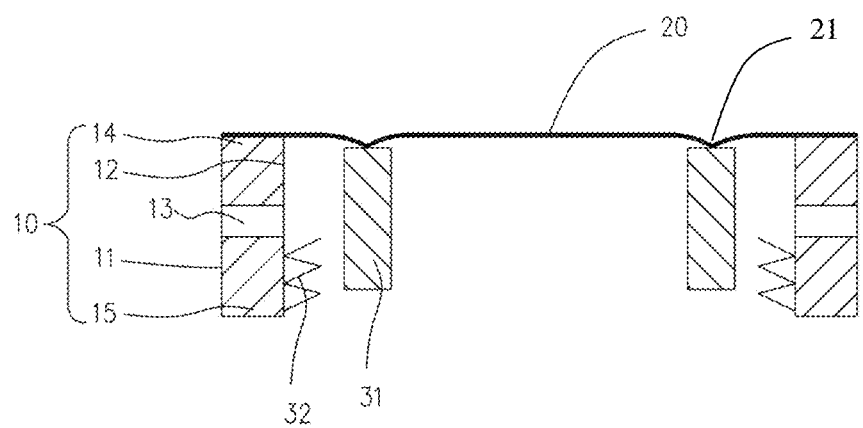
FIG. 3 illustrates a sectional view of a loudspeaker according to another embodiment of the present disclosure.

FIG. 3 illustrates another embodiment, the first driving member 31 is a magnet, while the second driving member 32 is a coil. The first driving member 31 is in the shape of a ring. The first driving member 31 is connected to the crimp 21 along the circumferential direction. The second driving member 32 is fixed to the inner circumferential side wall 12 along the circumferential direction.

Figure 4:
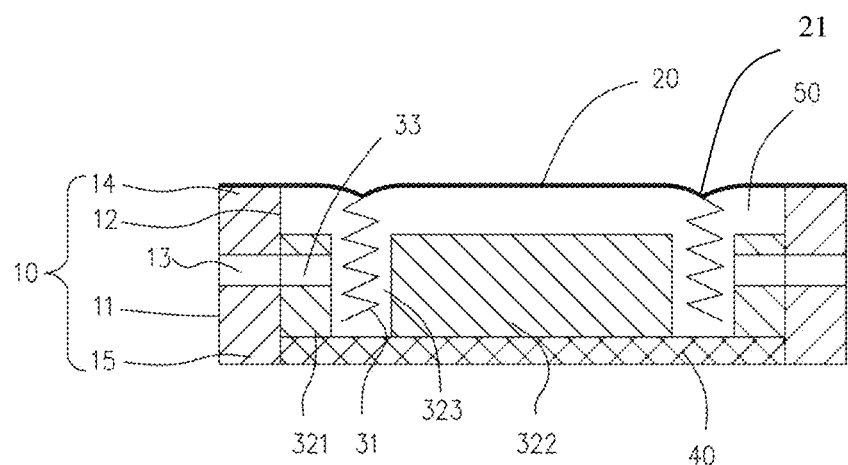
FIG. 4 illustrates another sectional view of a loudspeaker according to an embodiment of the present disclosure.

FIG. 4 illustrates that the loudspeaker 100 further includes a cover plate 40, the cover plate 40 is fixed to the frame 10 and arranged opposite to the diaphragm 20. A sounding cavity 50 is defined among the diaphragm 20, the cover plate 40 and the frame 10, and the acoustic output hole 13 runs through the sounding cavity 50.

In this embodiment, the first driving member 31 and the second driving member 32 are both located in the sounding cavity 50. The second driving member 32 is further connected to the cover plate 40. By arranging the cover plate 40 opposite to the diaphragm 20, the cover plate 40 reflects the sound wave emitted by the diaphragm 20, such that the sound wave can be emitted to the outer side of the frame 10 through the acoustic output hole 13. Moreover, the first driving member 31 and the second driving member 32 are located in the sounding cavity 50, making full use of an internal space of the sounding cavity 50 and hence reducing the thickness of the loudspeaker 100.

Figure 5:
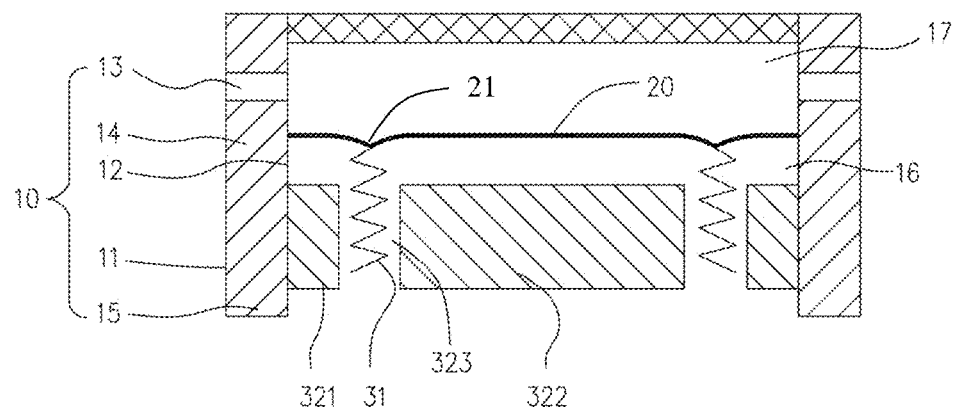
FIG. 5 illustrates a sectional view of a loudspeaker according to another embodiment of the present disclosure.

FIG. 5 illustrates another embodiment, the periphery of the diaphragm 20 can be fixed to the inner circumferential side wall 12. The diaphragm 20 partitions an inside space of the frame 10 into a first cavity body 16 and a second cavity body 17. The first driving member 31 and the second driving member 32 are both fixed in the first cavity body 16. The cover plate 40 closes the second cavity body 17. The acoustic output hole 13 runs through the second cavity body 17.

Furthermore, referring to FIG. 1, the acoustic output hole 13 is defined in the frame 10 and adjacent to the diaphragm 20. A distance between the acoustic output hole 13 and the diaphragm 20 is smaller than a distance between the acoustic output hole 13 and the cover plate 40, such that the sound wave emitted by the diaphragm 20 can be transmitted out to the outer side of the frame 10 through the acoustic output hole 13 conveniently. A plurality of acoustic output holes 13 are provided. The plurality of acoustic output holes 13 are arranged equidistantly along a circumferential direction of the frame 10. The plurality of acoustic output holes 13 are used to output the sound, which reduces the acoustic resistance of the loudspeaker 100 and increases a sound volume of the loudspeaker 100.

Figure 6:
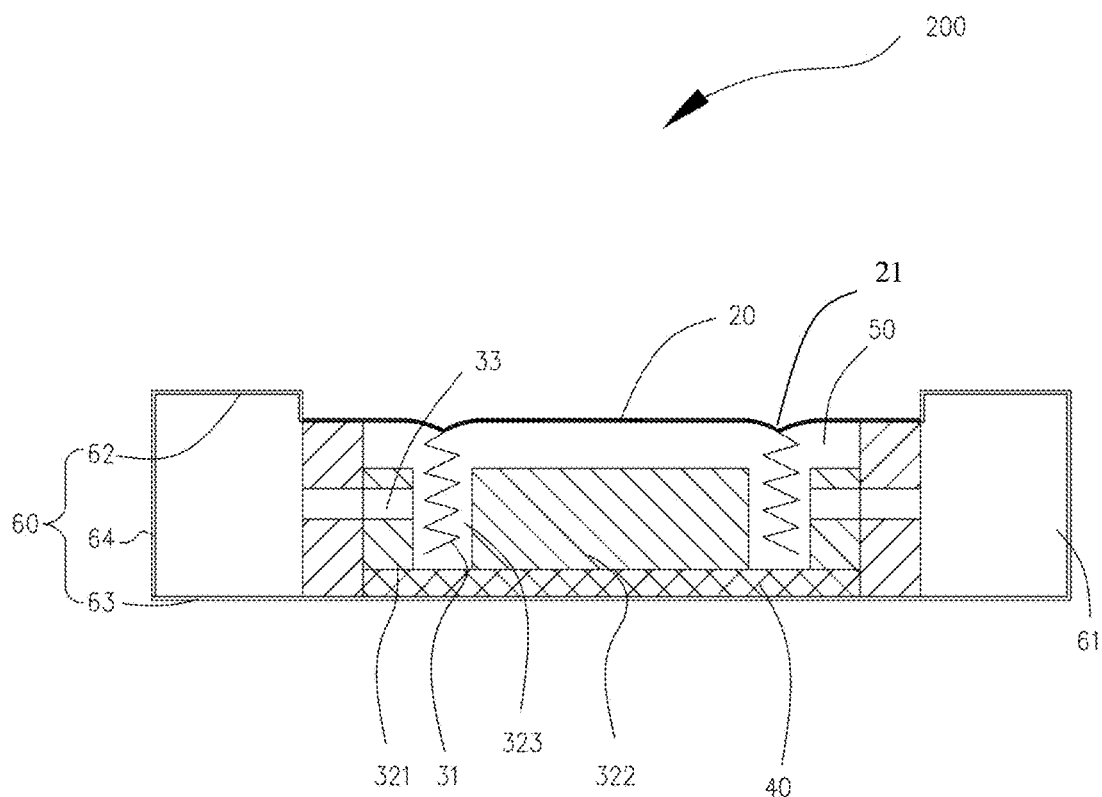
FIG. 6 illustrates a sectional view of a loudspeaker device according to an embodiment of the present disclosure.

FIG. 6 illustrates a loudspeaker device 200. The loudspeaker device 200 includes the loudspeaker 100 and a box body 60. The box body 60 defines a sealed volume chamber 61, and the loudspeaker 100 is fixed in the sealed volume chamber 61.

In this embodiment, a volume of the sealed volume chamber 61 is larger than that of the loudspeaker 100. The sound wave emitted by the diaphragm 20 of the loudspeaker 100 is transmitted to the sealed volume chamber 61 through the acoustic output hole 13. As a result, the sound wave oscillates back and forth in the sealed volume chamber 61, so that the box body 60 vibrates and sounds and then the user can receive the sound.

The box body 60 further includes a top plate 62 and a bottom plate 63 arranged opposite to the top plate 62, as well as a side plate 64 fixed between the top plate 62 and the bottom plate 63. The diaphragm 20 abuts against the top plate 62, and a distance between the side plate 64 to the frame 10 is larger than a distance between the bottom plate 63 and the frame 10.

In this embodiment, the cover plate 40 abuts against the bottom plate 63. That is, a distance between the bottom plate 63 and the cover plate 40 is smaller than the distance between the side plate 64 and the frame 10. A periphery of the cover plate 40 is fixed to an inner side of the frame 10, such that the distance between the bottom plate 63 and the frame 10 is smaller than the distance between the side plate 64 and the frame 10, and hence the box body 60 has a small enough thickness. A sufficient sound-transmitting space is defined between the side plate 64 and the frame 10, such that the sound wave oscillates back and forth between the frame 10 and the side plate 64 after being output through the acoustic output hole 13, and hence the box body 60 sounds.

Figure 7:
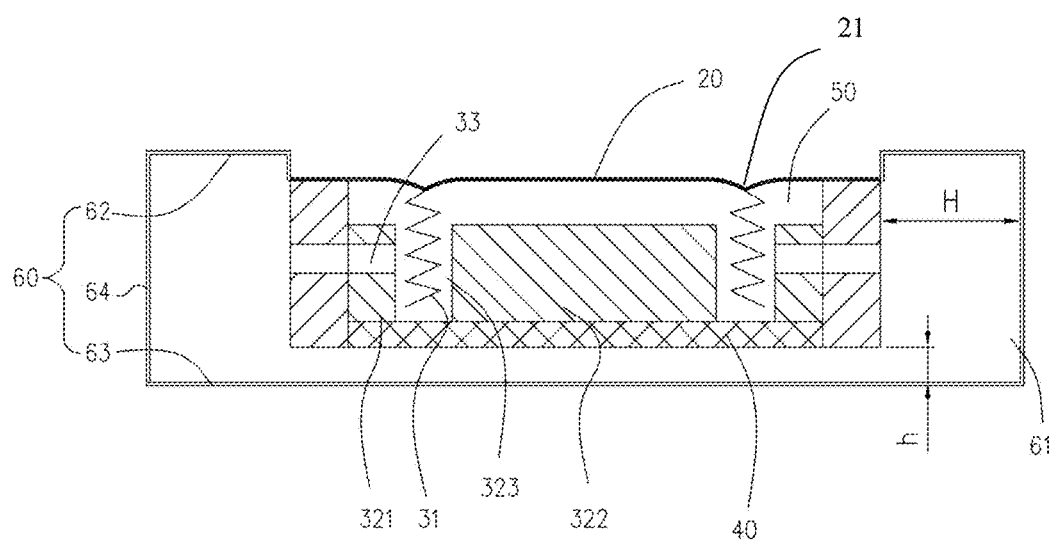
FIG. 7 illustrates a sectional view of a loudspeaker device according to another embodiment of the present disclosure.

FIG. 7 illustrates another embodiment, a first gap h exists between the cover plate 40 and the bottom plate 63, and a second gap H exists between the side plate 64 and the frame 10. The first gap h is smaller than the second gap H, such that the thickness of the box body 100 can be sufficiently small and the acoustic resistance between the acoustic output hole 13 and the side plate 64 is reduced.

Figure 8:
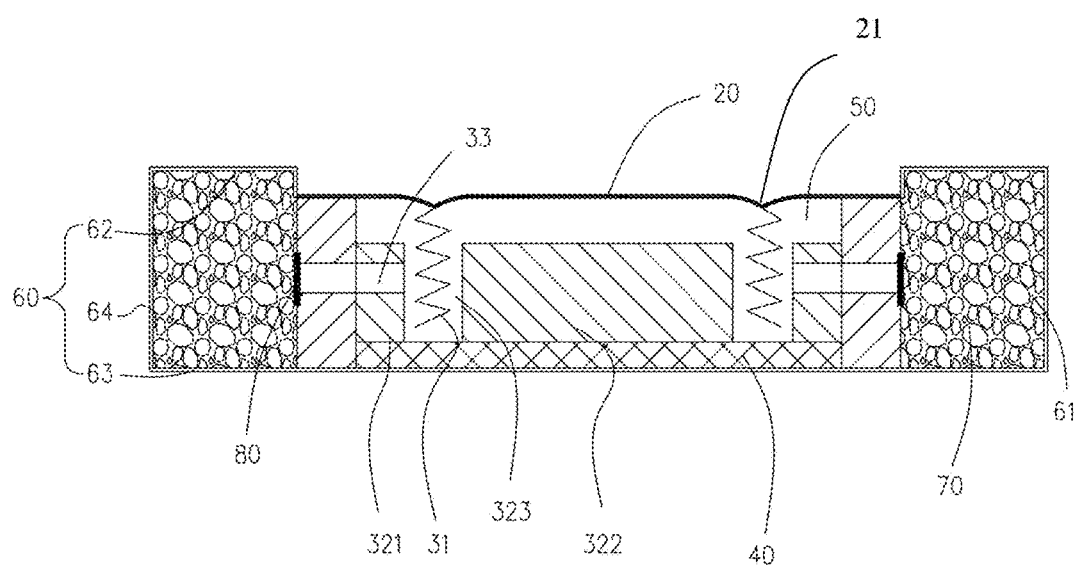
FIG. 8 illustrates another sectional view of a loudspeaker device according to an embodiment of the present disclosure.

Furthermore, FIG. 8 illustrates that sound-absorbing particles 70 are filled between the side plate 64 and the frame 10.

In this embodiment, the space between the side plate 64 and the frame 10 is full of the sound-absorbing particles 70. The sound-absorbing particles 70 absorb the sound wave outputted through the acoustic output hole 13, vibrate in the box body 60 after absorbing the sound wave, and strike the box body 60, such that the box body 60 vibrates and sounds. The sound wave is prevented from directly impacting the box body 60, so that the box body 60 sounds softly and enhances a bass effect of the loudspeaker device 200. Since the space between the side plate 64 and the frame 10 is completely filled with the sound-absorbing particles 70, the sound wave can be directly transmitted to the sound-absorbing particles 70 after being output through the acoustic output hole 13, and the sound-absorbing particles 70 can directly transmit acoustic energy to the box body 60 so as to improve the sound quality of the loudspeaker device 200.

Furthermore, the loudspeaker device 200 also includes a mesh 80 covering the acoustic output hole 13. The mesh 80 can shield an opening of the acoustic output hole 13 in the outer circumferential side wall 11, or can shield an opening of the acoustic output hole 13 in the inner circumferential side wall 12. By shielding the acoustic output hole 13 with the mesh 80, the sound-absorbing particles 70 are prevented from entering the sounding cavity 50, which otherwise will affect the sounding of the loudspeaker 100. The mesh 80 shields the acoustic output hole 13, such that the sound-absorbing particles 70 can be completely filled between the side plate 64 and the frame 10 with no need to be first packaged and then housed in the sealed volume chamber 61, which not only improves the sound quality of the loudspeaker device 200 but also reduces production cost of the loudspeaker device 200.

Figure 9:
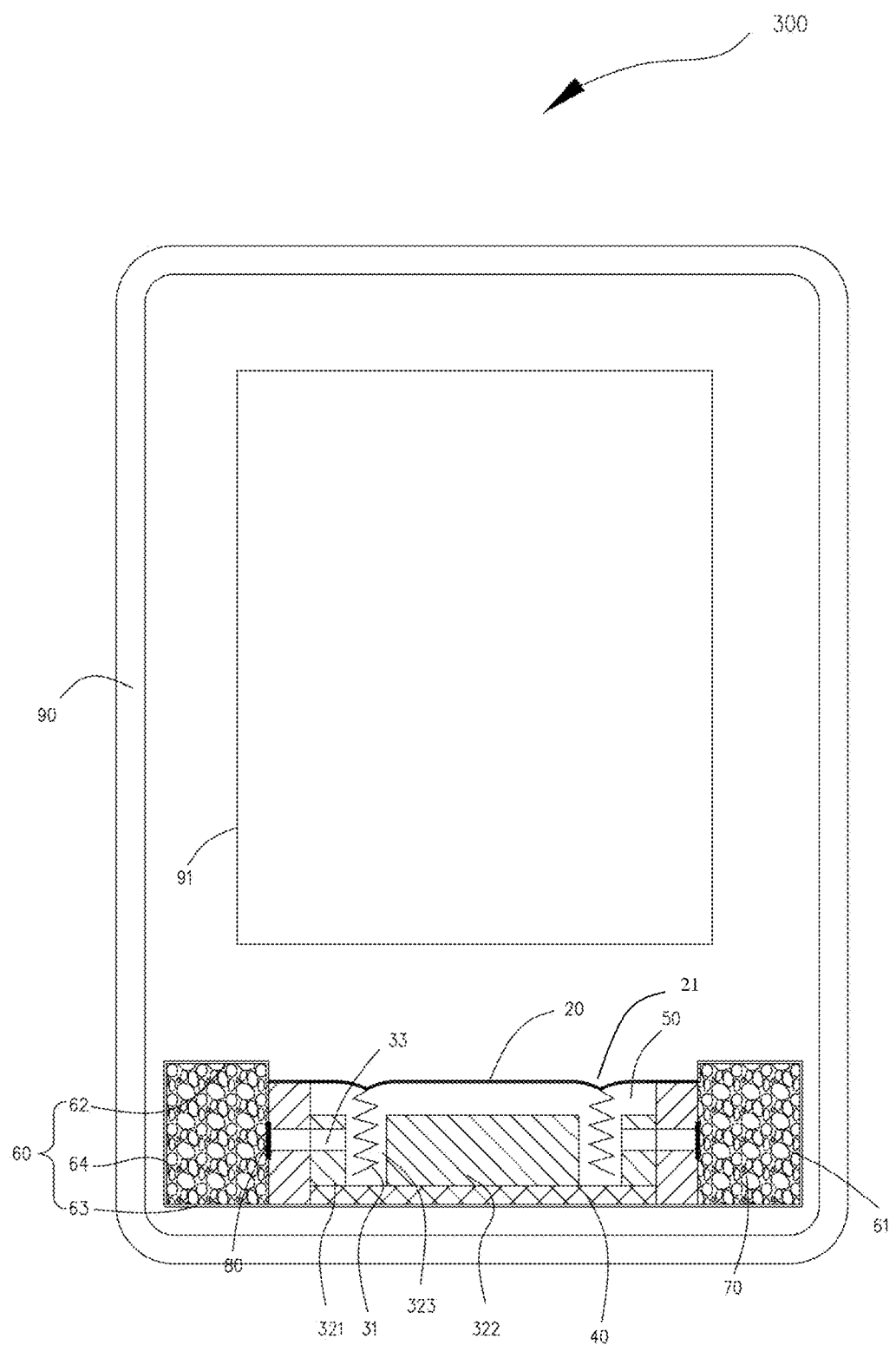
FIG. 9 illustrates a schematic view of a mobile terminal according to an embodiment of the present disclosure.

Referring to FIG. 9, the present disclosure further provides a mobile terminal 300. The mobile terminal 300 includes a housing 90 and a mainboard 91 fixed in the housing 90. The loudspeaker device 200 is fixed to a bottom end of the housing 90. The first driving member 31 of the loudspeaker 100 is electrically connected to the mainboard 91 to receive a current signal of the mainboard 91, and hence can vibrate relative to the second driving member 32 and make the loudspeaker 100 sound. It could be understood that the mobile terminal 300 can be a mobile phone, a tablet computer, a notebook computer or the like.

By defining the acoustic output hole from the outer circumferential side wall to the inner circumferential side wall of the frame, the sound wave emitted by vibration of the diaphragm passes through the acoustic output hole, and hence the user receives the sound. Since the acoustic output hole is not arranged opposite to the diaphragm, the side of the frame away from the diaphragm does not need to provide the sound transmission space, i.e. saving the space for use, and moreover, the sound wave emitted by the diaphragm is subject to reduced acoustic resistance after passing through the acoustic output hole, such that the user can receive relatively loud sound, i.e. improving the user experience.

The above involves embodiments of the present disclosure. It should be noted that those skilled in the art can make some improvements and modifications without departing from the principle of the embodiments of the present disclosure. These improvements and modifications also fall into the protection scope of the present disclosure.

What is claimed is:

1. A loudspeaker, comprising:
a frame having an outer circumferential side wall, an inner circumferential side wall arranged opposite to the outer circumferential side wall, and an acoustic output hole penetrating the outer circumferential side wall and the inner circumferential side wall;
a diaphragm having a periphery connected with the frame along a circumferential direction;
a drive assembly comprising a first driving member fixed to the diaphragm and a second driving member fixed to the frame, the first driving member being vibratory relative to the second driving member to drive the diaphragm to vibrate, thereby emitting a sound wave and making the sound wave pass through the acoustic output hole; and
a cover plate fixed to the frame and arranged opposite to the diaphragm, a sounding cavity being defined among the diaphragm, the cover plate and the frame, and the acoustic output hole running through the sounding cavity, wherein the cover plate is located inside the frame and in direct contact with the inner circumferential side wall, and a bottom face of the cover plate is flush with a bottom face of the frame.

2. The loudspeaker according to claim 1, wherein the first driving member is a coil, and the second driving member is a magnet.

3. The loudspeaker according to claim 2, wherein the second driving member comprises a first magnet fixed to the inner circumferential side wall and a second magnet surrounded by the first magnet, a gap exists between the first magnet and the second magnet.

4. The loudspeaker according to claim 3, wherein the diaphragm is provided with a crimp, the crimp extends along a circumferential direction of the diaphragm, the first driving member has a top connected to the crimp, and a bottom received in the gap.

5. The loudspeaker according to claim 3, wherein the first driving member oscillates up and down in the gap.

6. The loudspeaker according to claim 1, wherein the first driving member is a magnet, and the second driving member is a coil.

7. The loudspeaker according to claim 6, wherein the first driving member is in the shape of a ring, and the second driving member is fixed to the inner circumferential side wall along the circumferential direction.

8. The loudspeaker according to claim 7, wherein the diaphragm is provided with a crimp, the crimp extends along a circumferential direction of the diaphragm, and the first driving member is connected to the crimp along the circumferential direction.

9. The loudspeaker according to claim 1, wherein a periphery of the diaphragm is fixed to the inner circumferential side wall, the diaphragm partitions an inside space of the frame into a first cavity body and a second cavity body, the first driving member and the second driving member are both fixed in the first cavity body.

10. The loudspeaker according to claim 1, wherein the acoustic output hole is located in the frame and adjacent to the diaphragm.

11. The loudspeaker according to claim 1, wherein a plurality of acoustic output holes are provided, and the plurality of acoustic output holes are arranged equidistantly along a circumferential direction of the frame.

12. A loudspeaker device, comprising:
a loudspeaker, comprising:
a frame having an outer circumferential side wall, an inner circumferential side wall arranged opposite to the outer circumferential side wall, and
a diaphragm having a periphery connected with the frame along a circumferential direction,
a drive assembly comprising a first driving member fixed to the diaphragm and a second driving member fixed to the frame, the first driving member being able to vibrate relative to the second driving member, an acoustic output hole penetrating the frame and the second driving member; and
a cover plate fixed to the frame and arranged opposite to the diaphragm, the cover plate being located inside the frame and in direct contact with the inner circumferential side wall, and a bottom face of the cover plate being flush with a bottom face of the frame; and
a box body, the box body defining a sealed volume chamber, and the loudspeaker being fixed in the sealed volume chamber.

13. The loudspeaker device according to claim 12, wherein the box body comprises a top plate, a bottom plate arranged opposite to the top plate, and a side plate fixed between the top plate and the bottom plate; the diaphragm abuts against the top plate, and a distance between the side plate and the frame is larger than a distance between the bottom plate and the frame.

14. The loudspeaker device according to claim 13, wherein the cover plate abuts against the bottom plate.

15. The loudspeaker device according to claim 13, wherein a first gap exists between the cover plate and the bottom plate, and a second gap exists between the side plate and the frame, and the first gap is smaller than the second gap.

16. The loudspeaker device according to claim 13, wherein sound-absorbing particles are filled between the side plate and the frame.

17. The loudspeaker device according to claim 16, further comprising a mesh covering the acoustic output hole.

18. The loudspeaker device according to claim 17, wherein the mesh shields an opening of the acoustic output hole in the outer circumferential side wall, or shields an opening of the acoustic output hole in the inner circumferential side wall.

19. A mobile terminal, comprising:
a housing;
a mainboard fixed in the housing; and
a loudspeaker device fixed to a bottom end of the housing, the loudspeaker device comprising:
a loudspeaker, comprising:
a frame defining an acoustic output hole penetrating a circumferential side wall of the frame,
a diaphragm having a periphery connected with the frame along a circumferential direction,
a drive assembly comprising a first driving member fixed to the diaphragm and a second driving member fixed to the frame, the first driving member being able to vibrate relative to the second driving member; and
a cover plate fixed to the frame and arranged opposite to the diaphragm, the cover plate being located inside the frame and in direct contact with the inner circumferential side wall, and a bottom face of the cover plate being flush with a bottom face of the frame; and a box body, the box body defining a sealed volume chamber, and the loudspeaker being fixed in the sealed volume chamber.

20. The loudspeaker according to claim 1, wherein the second driving member is in direct contact with the frame.

\* \* \* \* \*